United States Patent [19]

Hauer et al.

[11] Patent Number: 4,958,525
[45] Date of Patent: Sep. 25, 1990

[54] WEB TENSION MEASURING ASSEMBLY

[75] Inventors: Horst-Walter Hauer; Gerda E. Hauer, both of Würzburg, Fed. Rep. of Germany

[73] Assignee: Koenig & Bauer Aktiengesellschaft, Würzburg, Fed. Rep. of Germany

[21] Appl. No.: 367,747

[22] Filed: Jun. 19, 1989

[30] Foreign Application Priority Data

Jul. 2, 1988 [DE] Fed. Rep. of Germany ....... 3822486

[51] Int. Cl.$^5$ .............................................. G01L 5/10
[52] U.S. Cl. ................................................. 073/862.48
[58] Field of Search ........... 73/862.48, 862.47, 862.45, 73/862.44, 862.55, 862.04

[56] References Cited

U.S. PATENT DOCUMENTS 4,581,947 4/1986 Wulf et al. ..................... 73/862.48
4,796,474 1/1989 Koenig ............................ 73/862.48

FOREIGN PATENT DOCUMENTS 2452925 5/1976 Fed. Rep. of Germany ... 73/862.48
3009454 9/1981 Fed. Rep. of Germany ... 73/862.44
362320 8/1987 Fed. Rep. of Germany .
3609623 10/1987 Fed. Rep. of Germany .
0102536 6/1985 Japan .............................. 73/862.04

Primary Examiner—Charles A. Ruehl
Attorney, Agent, or Firm—Jones, Tullar & Cooper

[57] ABSTRACT

A measuring roller, which may be a driven chill roller provided with a coolant supply and return assembly, is utilized as a web tension measuring roller. A measuring cage includes a flanged ring fixed to a side frame of the printing machine and a retainer ring joined to a bearing for the measuring roller. These two rings are connected by a plurality of flectional beams that are provided with strain gauges. Changes in web tension are sensed by the strain gauges in response to deflection of the flectional beams.

9 Claims, 3 Drawing Sheets

WEB TENSION MEASURING ASSEMBLY

FIELD OF THE INVENTION

The present invention is directed generally to a web tension measuring assembly. More particularly, the present invention is directed to a web tension measuring assembly for a web-fed rotary printing machine. Most specifically, the present invention is directed to a web tension measuring assembly which utilizes a measuring cage that carries a plurality of strain gauges. The measuring cage is positioned about a shaft journal and bearing assembly portion of a driven roller about which the web is moved. In web fed rotarY printing machines, the web must be moved in tight register. To insure that this is done, automatic controlling, regulating, checking and monitoring devices are utilized to avoid web breaks, particularly between the printing couples and a folder. The web tension measuring assembly is utilized to accomplish this web monitoring.

DESCRIPTION OF THE PRIOR ART

It is known generally in the art to provide various devices and assemblies that can be used to measure the tension of a moving web of printed material in a rotary web-fed printing machine. In German published unexamined patent application No. 3628208 there is shown one such device which is used to measure the web tension of a printed paper web on a driven drag roller. This roller is positioned after or downstream, in the direction of web travel, of the printing units of the web-fed rotary printing machine Each end of the drag roller is supported by a lever. The tension of the moving web is determined by means of a sensor, such as an optoelectic sensor, which operates without actually contacting the drag roller or its support levers. This sensor is attached to the machine frame so that a deflection of the drag roller in response to a change in web tension is measured.

The support of a drag roller assembly in the manner set forth in this German published unexamined patent application, No. 3628208 by using a pivotable lever at each end of the drag roller is an arrangement which requires a significant amount of space. It is often the situation that the necessary amount of space is not available. An additional drawback of this type of a device is that deflections of the drag roller caused by web tension changes are apt to cause register errors in the moving web.

A different type of Web tension measuring assembly is shown in German published unexamined patent application No. 3609628. This application shows the use of strain gauges mounted on flectional beams to sense the web tension. These flectional beams are each arranged on both bearing sides of a measuring roller and are situated diagonally to a supporting plate for the measuring roller and to a base plate which is attached to the machine frame. As with the prior device, the arrangement of diagonally positioned flectional beams requires a significant amount of space Often such space is not available in new machinery and also is not available if one were to attempt to retrofit an existing machine with this type of prior art device. Additionally, the measuring roller shown in this prior device is not a driven roller.

SUMMARY OF THE INVENTION

It is an object of the present invention to provide a web tension measuring assembly.

Another object of the present invention is to provide a web tension measuring assembly for a web-fed rotary printing machine.

A further object of the present invention is to provide a web tension measuring assembly for a driven roller of a web-fed rotary printing machine.

Yet another object of the present invention is to provide a web tension measuring assembly which uses a measuring cage that cooperates with a journal of a driven roller.

Still a further objection of the present invention is to provide a Web tension measuring assembly which includes strain gauges carried on flectional beams of a measuring cage.

Even yet another object of the present invention is to provide a web tension measuring assembly which requires very little space and can be retrofitted to existing rollers.

As will be discussed in greater detail in the description of the preferred embodiment which is set forth subsequently, the web tension measuring assembly of the present invention utilizes a measuring cage in which two spaced rings are joined by a plurality of flectional beams. One ring is secured to a bearing assembly for the roller over which the web whose tension is to be measured travels. The other ring is secured to the side frame of the machine. A plurality of strain gauges are attached to the flectional beams. As the tension in the web changes, the strain gauges will detect a change in the flectional beams. These readings can be interpreted by suitable devices and will show changes in web tension.

The web tension measuring assembly of the present invention measures tensile forces in both horizontal and vertical directions. This allows the assembly to be used with various rollers having different wrap angles and various positional orientations. Since the web tension measuring device utilizes a measuring cage that fits about a journal for a roller, it is easily possible to retrofit virtually any roller with the present assembly. This retrofitting, as well as initial installations of the web tension measuring assembly, are also enhanced because the device has a simple structure. This means that paper guide rollers which may be partially encircled by a paper web, can be retrofitted at any time and made into a measuring roller for providing a web tension measurement It is also quite possible to utilize the web tension measuring assembly of the present invention With rollers in which there is provided a flow of fluid or gas, such as a chill roller, and with rollers that may be driven.

Thus it will be seen that the web tension measuring device in accordance with the present invention provides a significant advance in the art.

BRIEF DESCRIPTION OF THE DRAWINGS

While the novel features of the web tension measuring assembly in accordance with the present invention are set forth with particularity in the appended claims, a full and complete understanding of the invention may be had by referring to the detailed description of the preferred embodiment which is set forth hereinafter and as is illustrated in the accompanying drawings in which:

DESCRIPTION OF THE PREFERRED EMBODIMENT

Figure 3:
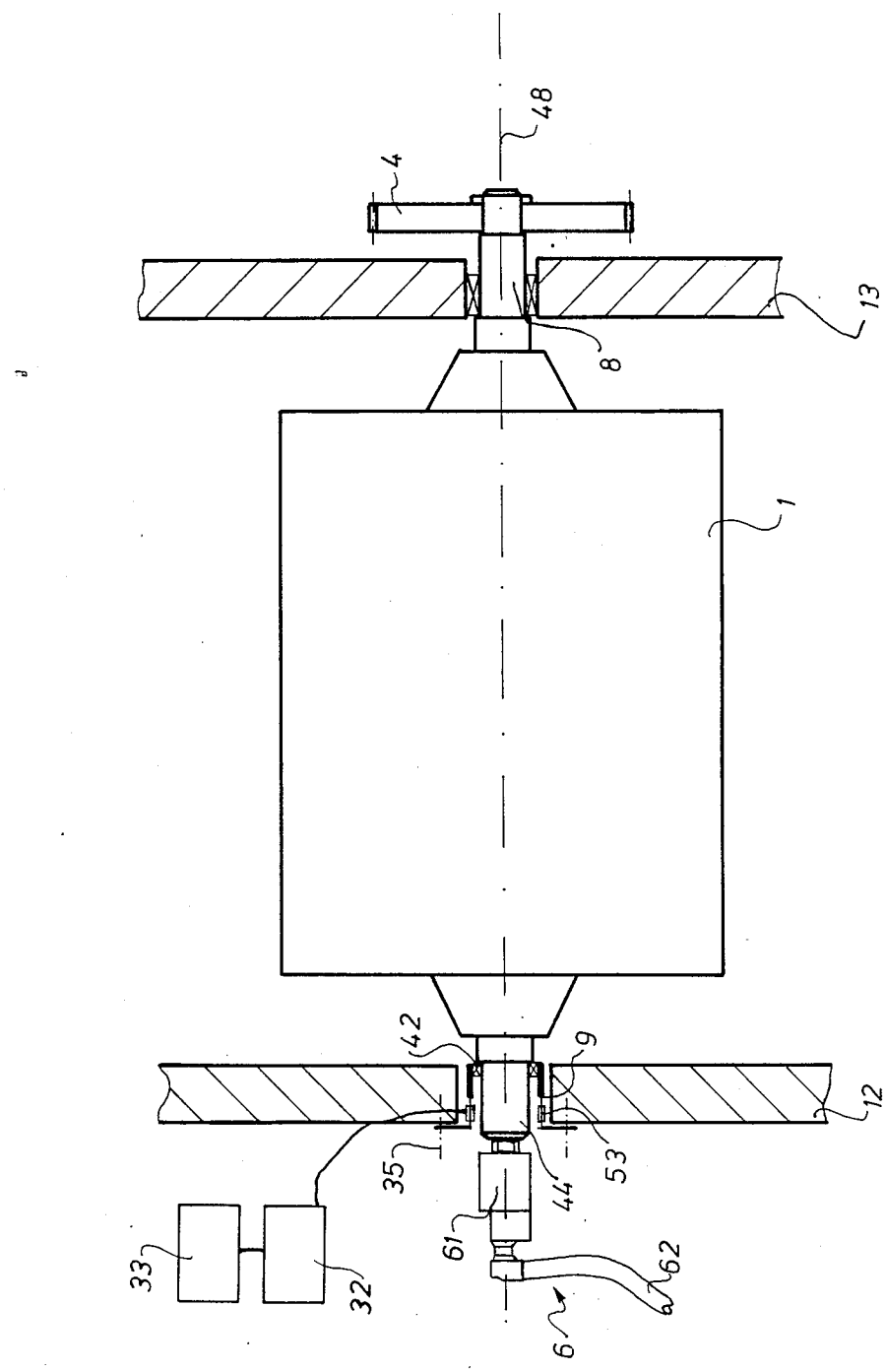
FIG. 3 is a schematic depiction of a measuring and/or chill roller and support.

Referring initially to FIG. 3 there may be seen generally at 1 a driven cylinder of a web-fed rotary printing machine. Cylinder 1 may be a driven chill roller which is positioned in the direction of web travel behind or after the web printing units, which are not shown. Driven chill roller 1 is, in the present invention utilized to measure the tension in a web which is in contact with the surface of the roller 1.

Measuring roller I is connected to a generally conventional roller drive assembly 4 at one end, and has a suitable chill roller supply and return assembly 6 at its opposing end. Measuring roller 1 has a bearing journal 44 which is carried on a floating bearing side adjacent chill roller supply and return assembly 6 by a retainer 9 which hereinafter will be referred to as a measuring cage. Measuring roller 1 also has a bearing journal 8 on a fixed bearing side adjacent the drive 4. The fixed bearing is carried in side frame 13 while the floating bearing is carried in side frame 12.

Figure 1:
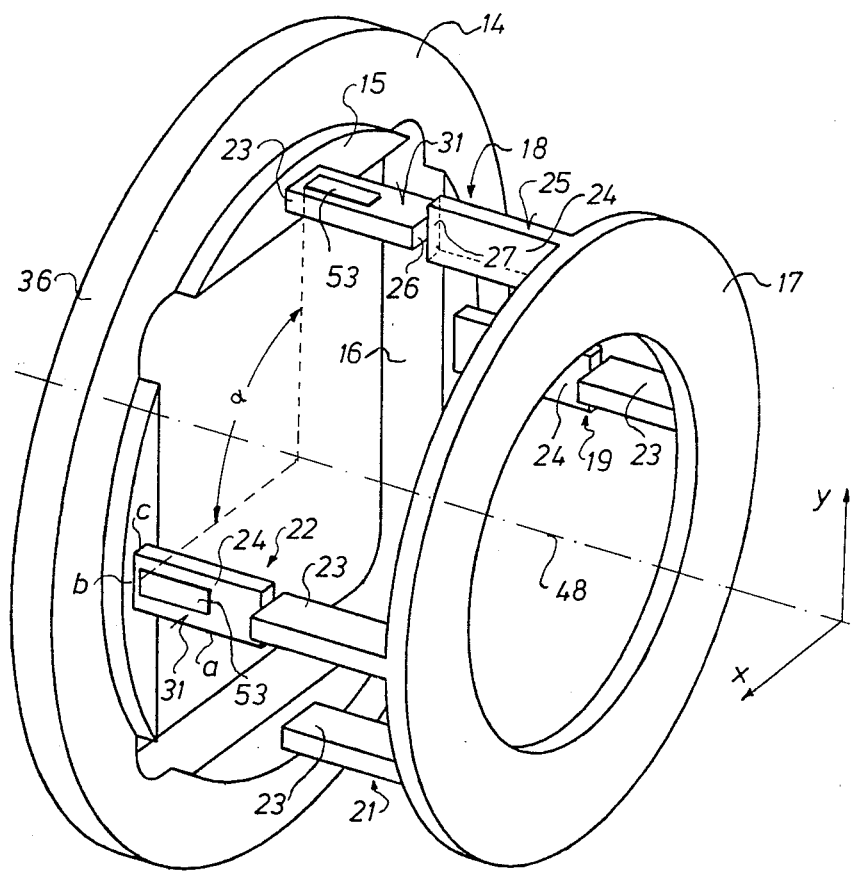
FIG. 1. is a perspective view of the measuring cage of the web tension measuring assembly in accordance with the present invention.

Turning now primarily to FIG. 1, the measuring cage 9 is structured having a circular flanged outer ring 14 with a square interior opening or breakthrough 16 and an inner retainer ring 17 which is arranged parallel to outer ring 14. The flanged outer ring 14 is connected to the retainer ring 17 by flectional beams 18, 19, 21 and 22 whose axes are parallel to each other. The flanged outer ring 14 carries an inner shoulder 15 that is useable to center the measuring cage 9 in a borehole 84 provided for the installation of the measuring cage 9 in the side frame 12. The four spaced flectional beams 18, 19, 21 and 22 are dimensioned such as to allow a springy deflection of the retainer ring 17 with respect to the flanged ring 14. The flectional means 18, 19, 21 and 22 are diametrically arranged with respect to each other at a distance $\alpha$ of 90° radian measure on the shoulder 15. Depending on the weight of the measuring roller 1, or the stiffness or sturdiness of the flectional beans 18, 19, 21 and 22, the number of these flectional beams can be smaller, for example 1 or 2.

The flectional beams or cross connections 18, 19, 21 and 22 are identical and each consists of two identical parallelepipeds 23 and 24. The parallelepipeds 23 and 24 each have different edge lengths a>b>c, as seen in FIG. 1, and are tightly connected to each other in a crossed or displaced by 90° configuration at one of their ends 26 or 27 having an edge length b or c. It is also possible to dispose the parallelepipeds 23 and 24 each with a square section in which lengths b and c are equal. The parallelepipeds designated as 28 are depicted with their base 81 and the edge lengths a and b in the y-direction so that they are able to deflect in the vertical or y-direction when a force is applied. The parallelepipeds designated as 24 are depicted with their base 31 and the edge lengths a and b in the x-direction so that they are able to deflect in the horizontal or x-direction when a force is applied.

The bases 31 of the parallelepipeds 23 and 24 are connected at their ends to the shoulder 15 of the flanged ring 14 so that their bases 31 referring to a cylinder axis 48, face in the radial direction. Similarly, the parallelepipeds 24, 23 are connected to the retainer ring 17 with their side faces 25, referring to the cylinder axis 48, positioned in the radial direction.

Figure 2:
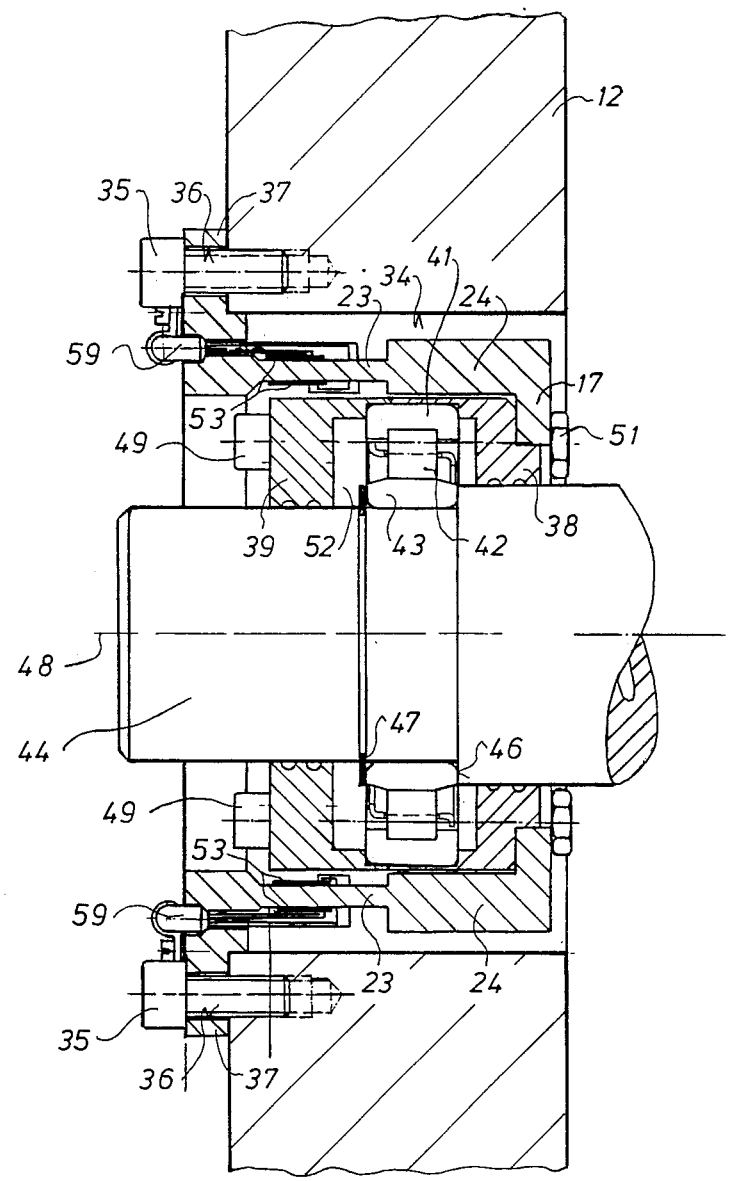
FIG. 2 is a side elevation view, partly in section showing a roller journal support for a driven roller and including the measuring cage of the present invention.

As may be seen most clearly in FIG. 2, the flanged ring 14 is screwed tightly to the side frame 12 so that the flanged ring 14 represents a fixed point when a deflectional load is applied to chiller roller 1. On the faces 31 supporting the deflectional load and arranged in radial alignment on the flanged ring 14 of the parallelepipeds 23 and 24 are arranged strain gauges 53. These strain gauges 53 are situated preferably close to the flanged ring 14 on its outer side. In order to obtain measuring values as exact as possible, the sensor of the strain gauges 53 is arranged and switched as a complete bridge circuit with four active strain gauges while temperature is simultaneously compensated. The strain gauges 53 are connected to appropriate evaluation and display devices, as depicted schematially at 32 and 33 in FIG. 3 by suitable electric leads 59. Such strain gauges and evaluation devices are known generally, for example as made by Hottinger Baldwin Meβtechnik and therefore are not described in detail.

Referring again to FIG. 2, the measuring cage 9 is smoothly introduced into a cooperatively sized borehole 34 in the side frame 12 and is tightly secured thereto by means of fastening screws 35 which pass through boreholes 36 of the flanged ring 14 and are received in cooperating boreholes in the outside of the side frame 12. The diameter of the borehole 34 is slightly larger than the outer diameter of the retainer ring 17 so that a deflection of the retainer ring 17, which is required for web tension measurement, is possible. The measuring cage 9 coaxially surrounds, without any contact, a bearing location consisting of an inner ring 38 and an axially spaced outer ring 39 for a bearing having an outer bearing ring, or race 41 for cylindrical roller bearings 42. An inner bearing ring, or race, 43 for the cylindrical roller bearings 42 is fixed on a bearing journal 44 of measuring roller 1 in the knoWn manner by means of a shaft shoulder 46 and a retaining ring 47. The outer ring 39, the inner ring 38 and the retainer ring 17 are connected to each other by several circumferentially spaced fastening screws 49 which are axially arranged parallel to the cylinder axis 48 and which are secured by means of counternuts 51. The inner and outer rings 38 and 39 are supported on the bearing journal 44 for sealing against liquids and create a grease retaining area 52 for the enclosed cylindrical roller bearings. A grease supply is provided, but is not shown.

In operation, the measuring roller 1 is contacted by a traveling web of printed matter, not shown. A change in the web tension results in a modification of the force acting on the measuring roller I This force is transmitted by the cylindrical roller bearing 42 and the inner ring 88 to the retainer ring 17 and results in a small deflection of the retainer ring 17 with respect to the flanged ring 14 on the side frame, thus deflecting the flectional beans 18, 19, 21 and 22. The strain gauges 53 secured on the parallelepipeds 23 and 24 are deformed and produce signals which are carried by the electric lines 59 to the evaluation and display device 32 and 33. The speed of measuring roller 1 is regulated manually or automatically by means of drive 4, depending on the deviation of the web tension from a preset standpoint to thus maintain a preset web tension. The web tension is simultaneously measured in both the x and y-directions in order to determine the web tension from the two measurable variables alternatively in front of or behind the driven measuring roller !. The web tension is determined by an additive combination of the x- and y-signals by the means of the evaluation device 32 while each individual signal depends on different parameters such as infeed/outfeed angle, distance between the position of the paper web and the sensor and the like.

The measuring cage 9 is preferably situated on the floating bearing location which is in side frame 12, with the drive 4 for the measuring roller i being on the opposite, fixed bearing location in side frame 13. This allows various possible cross forces, such as forces generated by helical drive gears and the like, to be taken up by the fixed bearing. This is why sensing of the deflection of the driven roller 1 is made only on the floating bearing side. It would be possible to increase the accuracy of the web tension measurements by supporting the measuring roller 1 in floating measuring cages 9 on both side frames 12 and 13. If this were to be done, the drive of the driven roller 1 would have to be effected by a cardan joint or the like with a corresponding lateral force compensation. While not discussed in detail, it will be understood that the chill roller supply and return assembly 6 is effected by means of a rotatable two way joint 61 which is carried at the floating bearing end of roller 1. A coolant supply and return hose 62 is elastically coupled to joint 61 in a suitable manner so that no forces created by the chill roller supply and return assembly 6 will act on the measuring roller 1 or the measuring cage 9.

While a preferred embodiment of a web tension measuring assembly in accordance With the present invention has been fully and completely set forth hereinabove, it will be apparent to one of skill in the art that a number of changes in, for example the drive arrangement for the driven roller, the size of the driven roller, the specific type of roller support bearing, the type of chill roller supply and return assembly and the like could be made without departing from the true spirit and scope of the present invention which is accordingly to be limited only by the following claims.

What is claimed is:

1. A web tension measuring assembly useable to measure tension in a web on a cylinder of a rotary printing machine, said web tension measuring assembly comprising:

means for supporting at least a first end of said cylinder in a measuring cage;

a flanged ring and a retainer ring included in said measuring cage; and a plurality of flectional beams connecting said flanged ring and said retainer ring, each of said flectional beams including first and second parallelepipeds, each first parallelepiped being arranged crossed to each second parallelepiped in each flectional beam.

2. The web tension measuring assembly of claim 1 wherein said flectional beams each extend between said flanged ring and said retainer ring generally in an axial direction of said cylinder.

3. The web tension measuring assembly of claim 1 wherein said first and second parallelepipeds each have three different edge lengths.

4. The web tension measuring assembly of claim 1 wherein said cylinder includes a drive means.

5. The web tension measuring assembly of claim 1 wherein said cylinder includes a fluid supply and return assembly.

6. The web tension measuring assembly of claim 1 including strain gauges on radially aligned faces of said flectional beams.

7. A web tension measuring assembly useable to measure a change in tension of a web passing in contact with a cylinder in a rotary printing machine, said web tension measuring assembly comprising:

a measuring cage deformably interposed between at least a first end of said cylinder and a first side frame of the rotary printing machine;

a flanged ring and a retainer ring included in said measuring cage;

a plurality of flectional beams connecting said flanged ring and said retainer ring, each of said flectional beams including first and second parallelepiped, each first parallelepiped being arranged crossed to each second parallelepiped in each flectional beam;

means to rotatably support said first end of said cylinder in said measuring cage and means to rotatably support a second end of said cylinder, and means on said measuring cage to send deformation of said measuring cage.

8. The web tension measuring assembly of claim 7 wherein said flanged ring is secured to a side frame of the rotary printing machine and further wherein said retainer ring is secured to a bearing means carried by said first end of said cylinder.

9. The web tension measuring assembly of claim 8 where in said measuring cage is supported in a bore in a side frame of the printing machine, said flanged ring being attached to said side frame adjacent an outer portion of said bore.

* * * * *